F. C. NIEBLING.
SQUARE AND BEVEL STRUCTURE.
APPLICATION FILED JUNE 4, 1919.
1,349,087.
Patented Aug. 10, 1920.
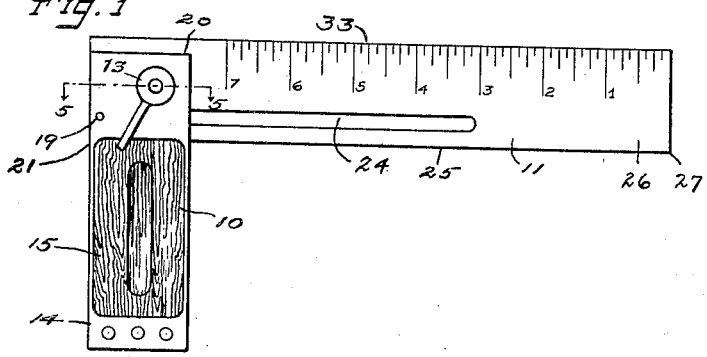
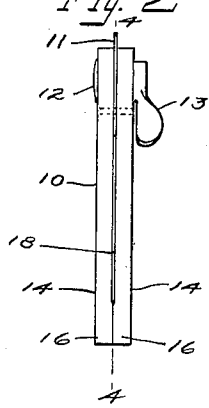
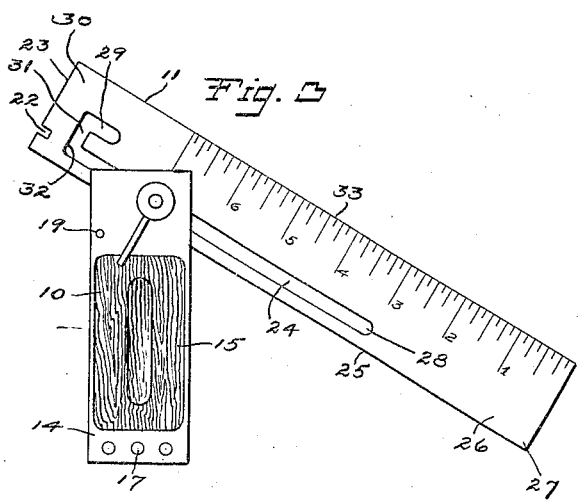
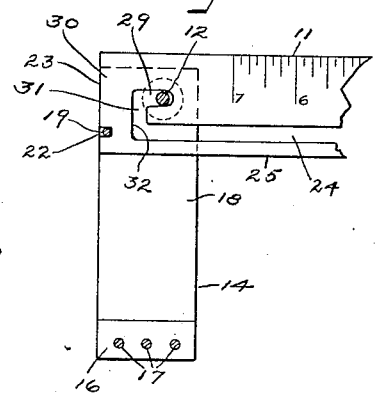
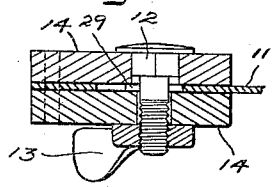
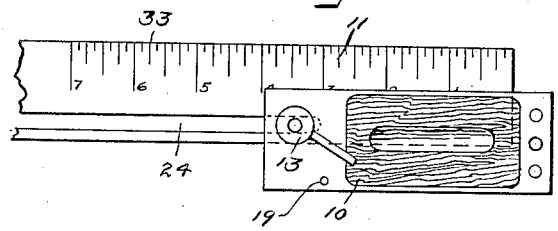
Inventor
Frederick Conrad Niebling
By Louis M. Schmidt
Atty.

UNITED STATES PATENT OFFICE.

FREDERICK CONRAD NIEBLING, OF SOUTHINGTON, CONNECTICUT.

SQUARE AND BEVEL STRUCTURE.

1,349,087. Specification of Letters Patent. Patented Aug. 10, 1920.

Application filed June 4, 1919. Serial No. 301,684.

*To all whom it may concern:*

Be it known that I, FREDERICK CONRAD NIEBLING, a citizen of the United States, residing at Southington, in the county of Hartford and State of Connecticut, have invented certain new and useful Improvements in Square and Bevel Structures, of which the following is a specification.

My invention relates to improvements in square and bevel structures for carpenters' use, and the object of my improvement is to produce a square and bevel structure in which the handle or body part and the blade part are adjustable so that they can be set relatively one to the other so as to serve either as a square or a bevel and when in position for use as a bevel can be set for different angles, the parts being foldable when not in use to a closed position so as to be relatively compact, and furthermore, having means for positively preventing a complete separation or disconnection of the parts.

In the accompanying drawing:—

Figure 1 is a side elevation of my improved square and bevel structure showing the parts adjusted for use as a square.

Fig. 2 is an end elevation of the same.

Fig. 3 is a side elevation showing the parts adjusted for use as a bevel.

Fig. 4 is a sectional view on the line 4—4 of Fig. 2.

Fig. 5 is a sectional view on the line 5—5 of Fig. 1, being on an enlarged scale.

Fig. 6 is a sectional view on the same scale as Fig. 4 that differs from the said Fig. 4 in having the parts adjusted or folded to the closed or compact position, being in convenient position for stowing away, as in a tool chest.

My improved square and bevel structure comprises a handle or body part 10 that serves as the fixed member and a member that is movable relatively to the said fixed member or part 10 in the form of a blade part 11, which parts are interconnected in such a manner so as to be usable either as a square, as shown in Fig. 1 or as a bevel, as shown in Fig. 3, and can be closed together, as shown in Fig. 6, into compact form, and the parts are provided with clamping means for retaining in either of the positions mentioned in the form of a clamping bolt 12 and a clamping nut 13, the latter being preferably some form of wing nut, as shown.

The handle part 10 is of rectangular form and of appreciable thickness, corresponding in general in size and appearance to the handle structures of some forms of carpenters' squares in common use, the frame structure being formed of metal and being provided with wooden handle scales, the said part 10 being slotted transversely for receiving and operatively housing the blade part 11. I find it convenient to form the handle part 10 of two mating parts, each of which comprises a metal body frame member 14 having a wooden handle scale 15, the two frame members 14 meeting along the lower edge portions 16 and being held together by a plurality of rivets 17. Above the said lower edge portions 16 the opposed portions of the frame members 14 are recessed or cut away so as to provide the slot 18 that is a fit for the blade part 11. Thus the handle part 10 is closed along the lower end by the meeting lower edge portions 16 and is open throughout the rest of the structure to the extent of the opening provided by the slot 18.

The upper end portion of the handle part 10, remote from closed end 16, is provided with a stop pin 19 that extends across the slot 18 and the said slot 18 is also crossed by the clamping bolt 12.

As shown in Fig. 1, with the parts adjusted for use as a square, the blade part 11 extends outwardly toward the right of the upper end portion of the handle part 10. In this position the clamping bolt 12 is located to the right of the middle of the handle part 10, being on or adjacent the forty-five degree line extending downwardly and toward the left from the upper right hand corner 20. The location of the stop pin 19 is appreciably below the transverse line or plane that extends across the axis of the clamping bolt 12 as to elevation or position in the longitudinal direction of the handle part 10, and the location thereof transversely of the handle part 10 is relatively close to the left edge or end face 21.

The stop pin 19 serves as one positioning member for positioning the parts when adjusted for use as a square.

The clamping bolt 12 serves also as such a positioning member and likewise serves as a locking device in coöperation with the clamping nut 13.

The blade part 11 is an elongated rectangular structure of sheet material that fits in the slot 18 and for coöperation with the handle part 10 is provided with a relatively short open slot 22 that extends inwardly from the left end or edge 23 for engaging with the stop pin 19, and is provided with a closed slot of peculiar form that serves as a guide way in coöperation with the clamping bolt 12.

The said closed slot comprises a main part 24 that extends in the longitudinal direction for the greater part of the length of the blade part 11 and is positioned adjacent and in parallelism with the bottom edge 25. The said main part 24 serves as the guide slot for the bolt 12 when the parts are in position for use as a bevel, as shown in Fig. 3, and also serves as the receiving slot for the said bolt 12 when the parts are in the closed position, as shown in Fig. 6.

When being brought to the closed position mentioned the outer, right hand end portion 26 of the blade part 11 is swung downwardly and inwardly relatively to the handle part 10, guided by the bolt 12 and main part 24 of the slot, until the parts are in parallelism and the outer lower corner 27 is received in the slot 18 and housed therein, the nut 13 being finally tightened to hold the parts. Thus when in the closed position the portion of the blade part 11 that is housed in the slot 18 is generally in the form of a rectangular zone that includes the lower outer corner 27 and extends inwardly along the lower edge 25 from the said corner. The parts are constructed and arranged so that in swinging the blade part 11 relatively to the handle part 10 the bolt 12 serves as a pivot and the pivotal member for coöperating therewith is the outer end wall portion 28 of the main part 24 of the closed slot.

The closed slot mentioned comprises in addition to the main part 24 an auxiliary part or slot 29 that is positioned in the left or inner end portion 30 of the blade part 11 that is relatively short, is directed in parallelism with the longitudinal axis of the blade part 11, and, as shown, is actually positioned substantially along the said axis, and which, furthermore, like the main part 24, is a fit for the clamping bolt 12.

The closed slot mentioned is completed by means of a short interconnecting part 31 that connects the inner or left ends of the main part 24 and the auxiliary part 29.

In shifting the parts from the position for use as a bevel to the position for use as a square the blade part 11 is moved toward the right relatively to the handle part with the bolt 12 moving along the main part 24 of the slot until the limit of such movement is reached by the bolt abutting against the inner end wall 32 of the slot, when by a sidewise movement the blade part 11 is pushed inwardly along the handle slot 18, the bolt 12 traveling along the interconnecting part 31, until the bolt 12 is brought into registration with the inner or left end of the auxiliary part 29. The parts are then brought to the final position by an inwardly directed longitudinal movement of the blade part 11, the clamping bolt 12 traveling along the auxiliary part 29 and the open recess 22 of the blade part 11 engaging with the stop pin 19, the nut 13 being tightened if desired to lock the parts in the adjusted position.

The upper edge portion 33 of the blade part 11 may be provided with scale markings, as shown, the said portion 33 being always exposed and available for use as a scale in all positions of the parts.

I claim as my invention:—

1. A square and bevel structure comprising a handle part of appreciable thickness and provided with a transversely directed slot and a blade part of sheet material fitting the said slot, a pair of positioning pin devices crossing the said slot and positioned in spaced relation along a line directed diagonally of the handle part, and the said blade part being provided with a set of slots for engaging with the said positioning pin devices for positioning the parts for use as a square comprising one slot for engaging with one of the said devices and a second slot, disconnected from the said one slot, for engaging with the other of the said devices.

2. A square and bevel structure comprising a blade part of sheet material and a handle part that is slotted for receiving the said blade part, a pair of positioning pins extending across the slot in the handle part, the blade part having a slot that opens inwardly from one end for separably engaging with one of the said pins and having in the body portion connected slots for the other of the said pins, comprising a main portion parallel with one edge, a second portion to one side of the said main portion, and a connecting portion interconnecting the said main portion and second portion.

3. In a square and bevel structure as described in claim 2, and the slot in the handle part being extended longitudinally and across one edge, suitably to receive the major portion of the blade part in one position of the parts.

FREDERICK CONRAD NIEBLING.